(12) United States Patent
Kramer et al.

(10) Patent No.: US 10,184,828 B2
(45) Date of Patent: Jan. 22, 2019

(54) APPARATUS AND METHOD FOR DETERMINING PROPERTIES OF A LASER BEAM

(71) Applicant: Primes GmbH Messtechnik fuer die Produktion mit Laserstrahlung, Pfungstadt (DE)

(72) Inventors: Reinhard Kramer, Pfungstadt (DE); Otto Maerten, Dreieich (DE); Stefan Wolf, Gross-Gerau (DE)

(73) Assignee: Primes GmbH Messtechnik fuer die Produktion mit Laserstrahlung, Pfungstadt (DE)

( * ) Notice: Subject to any disclaimer, the term of this patent is extended or adjusted under 35 U.S.C. 154(b) by 0 days.

(21) Appl. No.: 15/563,110

(22) PCT Filed: Mar. 17, 2016

(86) PCT No.: PCT/DE2016/000114
§ 371 (c)(1),
(2) Date: Sep. 29, 2017

(87) PCT Pub. No.: WO2016/155690
PCT Pub. Date: Oct. 6, 2016

(65) Prior Publication Data
US 2018/0080819 A1    Mar. 22, 2018

(30) Foreign Application Priority Data

Apr. 1, 2015   (DE) .................. 10 2015 004 163

(51) Int. Cl.
*G01B 11/08* (2006.01)
*G01J 1/42* (2006.01)
*G01J 1/04* (2006.01)

(52) U.S. Cl.
CPC ............ *G01J 1/4257* (2013.01); *G01B 11/08* (2013.01); *G01J 1/0425* (2013.01); *G01J 1/0474* (2013.01); *G01J 2001/4261* (2013.01)

(58) Field of Classification Search
CPC .............. G01B 11/2433; G01B 11/245; G01B 11/2425; G01B 11/08; G01B 11/02;
(Continued)

(56) References Cited

U.S. PATENT DOCUMENTS

| 5,064,284 A | 11/1991 | Johnston, Jr. et al. |
| 5,078,491 A | 1/1992 | Johnston, Jr. |

(Continued)

FOREIGN PATENT DOCUMENTS

| DE | 37 38 480 A1 | 5/1989 |
| DE | 199 09 595 A1 | 9/2000 |

(Continued)

OTHER PUBLICATIONS

German Office Action in DE 10 2015 004 163.0 dated Aug. 9, 2016 with English translation of relevant parts.
(Continued)

*Primary Examiner* — Michael P Stafira
(74) *Attorney, Agent, or Firm* — Collard & Roe, P.C.

(57) ABSTRACT

An apparatus for the determination of geometric parameters of a laser beam, such as, for example, the beam diameter or the focus diameter. The apparatus includes a device for the emission of a laser beam into an active region, a detector arrangement, which can be positioned in the active region, a device for the provision of a relative movement between the laser beam and the detector arrangement, and a device for the registration and evaluation of a temporally varying signal of the detector arrangement. The detector arrangement includes at least one light guide, at least two flight-diffusing structures, and at least one light-sensitive sensor.

(Continued)

Figure 1:
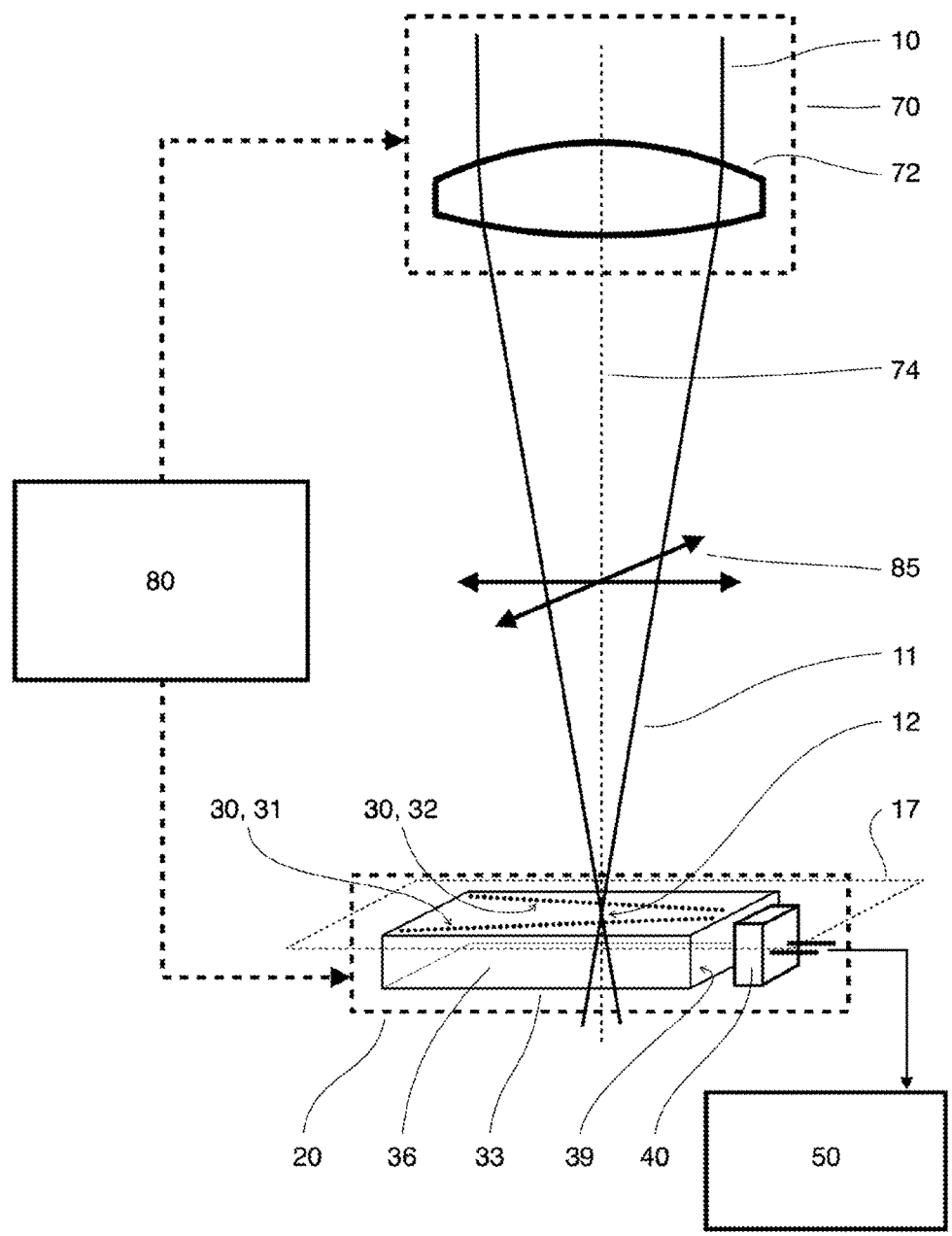

The light guide has a light-emitting surface and a light-conducting region, with an elongated shape. The at least two light-diffusing structures are essentially extended along two different directions.

19 Claims, 12 Drawing Sheets

(58) Field of Classification Search
CPC ... G01B 11/2504; G01B 11/00; G01B 11/002; G01B 11/028; G01B 11/0608; G01B 11/25; G01B 21/047; G01B 11/026; G01B 11/03; G01B 11/14; G01B 11/27; G01B 21/042; G01B 5/004; G01B 5/02; G01B 9/02014; G01B 9/02041; G01B 9/02044; G01B 9/02069; G01B 9/02091; G01N 21/45; G01N 21/9501; G01N 21/21; G01N 21/6458; G01N 2201/06113; G01N 2201/0683; G01N 2201/0697; G01N 2021/6439; G01N 2021/6441; G01N 21/6408; G01N 21/645; G01N 2333/16; G01N 2333/91245; G01N 2500/02; G01N 11/00; G01N 11/16; G01N 15/1434; G01N 15/1459; G01N 15/147; G01N 2011/008; G01N 2015/1006; G01N 2015/1452; G01N 2015/149; G01N 2021/1787; G01N 2021/456; G01N 2021/4709; G01N 2021/8874; G01N 21/00; G01N 21/171; G01N 21/4795; G01N 21/636; G01N 21/64; G01N 21/6456; G01N 21/8806; G01N 2201/067; G01N 2201/0691; G01N 2203/0089; G01N 2203/0094; G01C 15/006; G01C 15/00; G01C 15/002; G02B 27/281; G02B 27/283; G02B 27/286; G02B 5/0816; G02B 5/3083; G02B 6/02042; G02B 6/03644; G02B 6/262; G02B 6/35; G02B 6/3508; G02B 6/4206; G02B 6/4296; G02B 21/0032; G02B 21/0028; G02B 21/0076; G02B 26/06; G02B 26/10; G02B 26/105; G02B 27/0927; G02B 27/0955; G02B 27/0966; G02B 27/0994; G02B 27/10; G02B 27/106; G02B 27/46; G02B 27/58; G02B 5/005; G02B 5/1814; G02B 5/1828; G02B 5/1857; G02B 6/0006; G02B 6/0008; G02B 6/4207; G02B 7/02; G02B 7/021; G02B 7/026
See application file for complete search history.

(56) References Cited

U.S. PATENT DOCUMENTS

| | | |
|---|---|---|
| 6,151,109 A | 11/2000 | Broemssen et al. |
| 6,501,061 B1 | 12/2002 | Kitai et al. |
| 2007/0045255 A1* | 3/2007 | Kleine ............... B23K 26/38 219/121.72 |
| 2010/0196624 A1* | 8/2010 | Ruuttu ............... B23K 26/067 427/569 |
| 2014/0027421 A1 | 1/2014 | Notheis |

FOREIGN PATENT DOCUMENTS

| | | |
|---|---|---|
| DE | 10 2005 038 587 A1 | 2/2007 |
| DE | 10 2007 053 632 A1 | 5/2009 |
| DE | 10 2008 024 068 B3 | 1/2010 |
| DE | 10 2011 006 553 A1 | 10/2012 |
| DE | 10 2011 054 941 B3 | 1/2013 |
| DE | 10 2012 106 779 A1 | 1/2014 |
| EP | 0 461 730 A1 | 12/1991 |
| JP | S62-24117 A | 2/1987 |
| JP | H01-107990 A | 4/1989 |
| JP | 2000-310559 A | 11/2000 |
| JP | 2008-264789 A | 11/2008 |
| KR | 10-2013-0121413 A | 11/2013 |
| WO | 98/50196 A1 | 11/1998 |

OTHER PUBLICATIONS

International Search Report of PCT/DE2016/000114, dated Aug. 1, 2016.
Abstract of Kelly C. Jorge et al.: "Scattered light imaging method (SLIM) for characterization of arbitrary laser beam intensity profiles", Applied Optics, Optical Society of America, vol. 53, No. 20, Jul. 10, 1014 (Jul. 10, 2014).

* cited by examiner

APPARATUS AND METHOD FOR DETERMINING PROPERTIES OF A LASER BEAM

CROSS REFERENCE TO RELATED APPLICATIONS

This application is the National Stage of PCT/DE2016/000114 filed on Mar. 17, 2016, which claims priority under 35 U.S.C. § 119 of German Application No. 10 2015 004 163.0 filed on Apr. 1, 2015, the disclosures of which are incorporated by reference. The international application under PCT article 21(2) was not published in English.

FIELD OF THE INVENTION

The invention relates to an apparatus and a method for the determination of properties of a laser beam. The properties of the laser beam are determined by scanning the laser beam. A typical field of application is beam diagnostics or the verification of properties of a laser beam in laser material processing systems. The apparatus and the method are adapted for determining geometrical parameters of a laser beam such as the beam diameter or the focus diameter. The determination of a beam profile of the laser beam is also provided. The apparatus and the method are also suitable for determining a position of the laser beam. The apparatus and the method are also intended for beam diagnostics on optical systems for remote laser material processing, in which the focus position can be freely positioned and moved within a working area by means of a scanning device.

BACKGROUND OF THE INVENTION

The determination of properties of a laser beam is of interest in many technical fields. A typical area is the measurement and testing of beam properties in laser material processing systems to ensure a consistently high processing quality.

To achieve a high process quality in laser material processing systems, compliance with process and laser parameter within narrow limits is necessary. The process windows are very small especially in highly dynamic processing systems. In order to ensure the processing quality, a frequent and exact inspection of the properties of the laser beam is therefore necessary. This is particularly true for systems in which the laser beam can be freely positioned and moved by means of a scanning device in a at least two-dimensional working area, for example by deflecting the beam using movable mirrors and a subsequent scanner optics. Such remote laser processing systems have a variety of applications, such as marking, welding, cutting, and the like. A relatively new application is Selective Laser Melting (SLM). In this method, complex three-dimensional objects can be produced through local melting or sintering of successive thin layers of a powdered material. A shortening of the production time is desirable, since the production time of the objects is naturally long in such a process. To achieve this the laser beam must be moved faster, which in turn requires higher laser powers in order to melt the powder in a shorter time. Therefore, laser beams with very small focus and relatively high power are used in SLM systems, in other words, beam sources with high brilliance in which extremely high-power densities may be present in the focus of the laser beam.

Many different methods and devices suitable for this purpose are known for determining the geometrical properties of a laser beam. A first rough classification of the methods can be made according to whether a spatially resolving (e.g. pixel-based) sensor is used for the measurement, or whether the beam is scanned in a method with raster-like movement in a temporal-spatial manner.

In the first group of methods employing a spatially resolving sensor, there is always the problem that conventional pixel-based sensors do not tolerate high power densities, and therefore a beam splitting (or coupling-out or sampling), attenuation and/or imaging of the beam is always required when a beam of high power density is to be measured. However, the beam is always also influenced in its properties through the beam splitting, attenuation or imaging. For instance, optical elements such as lenses, beam splitters and attenuators can already cause thermally induced changes in the imaging due to a very slight absorption of the laser radiation. It is therefore hardly possible to ensure that the measured quantities are explicitly related to the desired quantities directly in the beam. Regarding this problem, reference is made to the publication no. DE 10 2012 106 779 A1. An optical system for measuring laser radiation is disclosed there. In the disclosed apparatus, the explicit relation of the measured quantities to the sought quantities directly in the beam can only be approximately achieved in a complex interplay of various beam splitters and imaging elements from different materials. Furthermore, the apparatus disclosed is only suitable for measuring stationary laser beams.

Other apparatuses for determining the properties of a laser beam, in which a spatially resolving sensor is used for the measurement, are briefly mentioned below only for the sake of completeness.

The publications JP H01-107 990 A (abstract) and JP 2008-264 789 A (abstract) disclose, for example, devices with location-resolving sensors which are intended for the geometrical calibration of remote systems. In these apparatuses, the light scattered by a substrate arranged in the working area is imaged onto a camera by means of a lens. From this, the position of the beam in the working area can be determined and compared with the desired position. However, such apparatuses are not suitable for measuring the focus diameter or a beam profile in the focus of the laser beam because of the achievable spatial resolution.

In the devices shown in DE 10 2007 053 632 A1 and DE 10 2011 054 941 B3, a fraction of the laser beam to be measured is reflected and thrown back into the optical system which emits the laser beam. In this case, the reflected-back beam is coupled out within the optical system and is evaluated by a location-resolving sensor. In this case, the reflection of the beam takes place, for example, at a boundary surface of the imaging optical system, typically at the last boundary surface of the focusing lens or at a subordinate protective glass. The disadvantage with these apparatuses is that the back-imaging by the focusing lens is partially loaded with considerable imaging errors, since the back-reflected beam has different dimensions and waist positions, and the correction of the focusing lens is not simultaneously designed for the imaging of back-reflections with other dimensions and waist positions. The systems of this type at the current state of technology are therefore not suitable for precise beam measurement.

The second group of methods for the determination of properties of a laser beam is characterized by a spatial-temporal scanning of the beam in a raster-like movement. This group can be divided into two subgroups according to whether the beam is sampled quasi-point-shaped or whether the type of scanning generates a signal which already contains information integrated in a spatial direction. The latter subgroup includes devices with sampling by slit apertures and knife-edge diaphragms.

Apparatuses with quasi-point-shaped sampling systems, for example by means of a measuring orifice or a measuring needle whose opening is small compared to the beam diameter, are known, for example, from DE 199 09 595 A1 and EP 0 461 730 A1. The detector is typically guided in a line-by-line scanning movement through the cross-section of the beam. In doing so, the beam must be scanned in many passages with mutually slightly shifted lines.

In the case of apparatuses for beam diagnosis in remote laser processing systems, the special feature is that the laser beam can be deflected by means of a scanning device in typically two dimensions so that the beam can be freely positioned in a planar or sometimes also three-dimensional working space. In this case, it is also possible for the sampling device to be stationary and that the beam is guided across the sampling probe by means of the scanner.

The process disclosed in DE 10 2005 038 587 A1, for example, works according to the latter principle. A measuring system is proposed therein in which, using a deflection system, a laser beam can be moved in a definable pattern across a detector arrangement. A similar method according to this principle is shown in DE 10 2011 006 553 A1. It specifies a method for determining the focal position or the beam profile of a laser beam by means of scanning optics, in which a pinhole aperture with a downstream detector is arranged at several measuring points in the working space of the laser beam. The laser beam is moved over the measuring hole of the pinhole aperture using the scanner optics according to an xy grid at each of the measuring points for an xy focus position or beam profile measurement. Another, similar device of the aforementioned type is disclosed in U.S. Pat. No. 6,501,061 B1. The laser beam is scanned across an aperture and the scanner can be position-calibrated by comparing the scanner position data at the time of the laser beam detection.

Publication No. KR 10 2013 0 121 413 A (abstract) also shows a calibration system for a laser beam scanner. There, a calibration plate is disclosed in which light-diffusing areas are formed in several points. The light reflected from the light-diffusing areas of the calibration plate is received by a light sensor part which is arranged adjacent to the calibration plate. The apparatus shown is thus not suitable for determining a beam diameter or a beam profile of a laser beam. Furthermore, it is also not possible with the device shown to exactly discriminate which of the light-diffusing points is hit by the laser beam.

The accuracy of the quasi-point-shaped scanning methods is, in principle, limited, inter alia by the size of the measuring orifice, the accuracy of the guiding movement, the synchronization of the individual lines, and not least by the reproducibility or the temporal constancy of the laser beam. A moving laser beam can thus not be measured by means of methods of this type or only under very special circumstances. In addition, the measuring orifices or measuring needles of the known devices are also only suitable for certain maximum power densities and can be destroyed in the case of highly brilliant, focused laser radiation.

A scanning can also be performed using a line-shaped sampling probe, for example with a line aperture, a knife-edge or a slit diaphragm. In the case of linear scanning, the beam intensity is already integrated in one direction. The advantage is that the beam diameter can be determined with a single scanning pass. The publications U.S. Pat. No. 5,078,491 A and JP S62-2 4117 A (abstract) disclose, for example, devices with linear scanning systems. However, even with these devices known from prior art, it is disadvantageous that the measuring orifice or knife-edge diaphragm, as well as the detectors located behind them, are suitable only for certain maximum power densities and can be destroyed in case of highly brilliant, focused laser radiation, and that the measurement of moving laser beams is not sensibly possible.

The publication no. WO 98/50 196 A1 discloses a device for detecting and calculating a focus point position, a shape, and a power distribution of a laser beam after a focusing lens. The described device includes amongst other things a light affecting body and a light sensor. The laser beam and the light affecting body are movable relative to each other, to perform a tracing movement through the laser beam. The light affecting bodies are described as optical fibers; reflective, e.g. silver-containing bodies or absorbing bodies are described as alternatives. Thus, the designs shown are on the one hand not suitable for laser radiation of highest power and brilliance, and on the other hand, the described apparatus is not suitable for achieving high spatial resolution since the disclosure does not describe an exactly defined interaction geometry on or in the light affecting bodies.

From the publication JP 2000-310 559 A (abstract) a device is known, in which a beam that is deflected by a polygon scanner is moved over optical grids with different orientations. The light which passes the grid is captured with a photoelectric converter element and the received signal is an oscillating signal, from the amplitude of which a beam diameter can be determined. The procedure shown is thus not suitable for determining the position of a beam and beam profile. Moreover, the use with high power laser radiation is limited by the power compatibility of the used grids and the photoelectric converter element.

The devices known from the state of the art with linear or knife-edge scanning thus also have the well-known disadvantages: the power compatibility is limited; the knife-edges, slit apertures or other line-shaped detection elements used can be destroyed through a focused, highly brilliant laser beam of high power. Furthermore, the majority of processes known can only determine beam dimensions in the scanning direction. In general, the achievable spatial resolution is limited, especially in scanning systems that should be suitable for higher performance. In many methods, a determination of a beam profile is not possible or only with low resolution. The determination of a lateral position of the laser beam in a field of work is also usually not possible. Moreover, the measurement of a moving laser beam is not possible or only in special cases with preset laser beam control.

The apparatuses and methods known from state of the art thus have serious disadvantages both with regard to the achievable accuracy and spatial resolution, as well as with regard to the compatibility with laser beams with high power and finally with regard to the measurement of laser radiation in large working areas or in case of moving laser beams.

SHORT DESCRIPTION OF THE INVENTION

Therefore, the invention is based on the task to create a method and an apparatus for determining properties of a laser beam, which are suitable for the measurement of laser radiation with highest power and brilliance and allow an accurate determination of at least one geometric beam parameter such as a beam diameter or a beam profile, and which can also be used in a large working area of the laser beam or with moving laser beams.

To solve the problem, an apparatus for determining the properties of a laser beam is proposed, which includes a device for the emission of a laser beam into an active region, a detector arrangement, which is arrangeable in the active region, a device for the provision of a relative movement between the laser beam and the detector arrangement and a device for recording and evaluation of a temporally varying signal of the detector arrangement. The detector arrangement includes at least one light guide, at least two light-diffusing structures, and at least one light-sensitive sensor. The at least one light guide has a light-emitting surface and a light-conducting region, wherein the light-conducting region has an elongated shape. The at least two light-diffusing structures include a first light-diffusing structure and a second light-diffusing structure. While the first light-diffusing structure is essentially extended along a first direction, the second light-diffusing structure is essentially extended along a second direction. The first direction and the second direction include an angle different from zero. The at least one light-sensitive sensor is configured to receive radiation, which is emitted from the light-emitting surface of the light guide. In addition, the at least two light-diffusing structures are configured for scattering a part of laser beam, impinging on the light-diffusing structures, in an angular range which is adapted for the transport of scattered laser radiation in the light-conducting region of the light guide to the light emitting surface.

In one of the variations of the invention, it is provided that the device for the provision of a relative motion is configured to scan a cross-section of the laser beam by means of the detector arrangement.

The device for the provision of a relative movement can also be configured to scan a cross-section of the laser beam by means of the detector arrangement in two different directions.

In one variant of the invention, the relative movement may be essentially a circular movement or an elliptical movement.

The relative movement can essentially also be a rotational movement.

It is provided in one of the variations that the relative movement includes a first and a second component, and the first component is an at least partly periodic fast movement and the other component is a slow movement in a linearly independent direction of the direction of movement of the first component.

In a possible variation of the invention, both the first light-conducting structure extended in the first direction and the second light-conducting structure extended in the second direction are part of the at least one light guide.

In another variant, the detector arrangement includes at least two light guides. The first light-conducting structure, extended in the first direction, is part of a first of the at least two light guides, and the second light-conducting structure, extended in the second direction, is part of a second of the at least two light guides.

The at least one light guide can be made of a transparent optical material with very low absorption.

In one variation of the invention it is provided that a transparent optical material of the light guide contains an absorption specific for the wavelength of the laser radiation of less than 300 ppm/cm.

In a possible variation of the invention, the device for the provision of a relative movement can include a device for the movement of the detector arrangement.

The device for the provision of a relative movement can also include a device for the movement of the laser beam.

It is provided in a further variation of the invention that the device for the movement of the laser beam includes scanner optics.

A method for determining the properties of a laser beam which comprises the following process steps, is also proposed to solve the problem. A laser beam is emitted into an active region. A detector arrangement is positioned in the active region. The detector arrangement includes at least one light guide, at least one light-sensitive sensor, and at least two light-diffusing structures, and a first light-diffusing structure of the at least two light-diffusing structures is essentially extended along a first direction, and a second light-diffusing structure of the at least two light-diffusing structures is essentially extended along a second direction. The first direction and the second direction include an angle different from zero. A relative movement is provided between the laser beam and the detector arrangement. Scattered radiation is generated by means of the light-diffusing structures from a part of the laser beam. A part of the scattered radiation is transported in a light-conducting region of the at least one light guide to a light-emitting surface of the at least one light guide. Radiation emitted from the light-emitting surface is received by means of a light-sensitive sensor and a temporally varying signal is generated from the received radiation. Finally, the temporally varying signal is recorded and evaluated.

In one variation of the method, a scanning of a cross-section of the laser beam by means of the detector arrangement is provided.

In a further variation of the invention it is provided that a cross-section of the laser beam is scanned in two different directions by means of the detector arrangement.

The laser beam can be moved in a circular or ellipsoidal path relative to the detector arrangement.

In a further variation of the invention the detector arrangement can be rotated relative to the laser beam.

In a further variation of the invention it is provided that the laser beam is moved relative to the detector arrangement in a movement with a first component and a second component. The first component is an at least partially periodic rapid movement and the second component is a slow movement in a direction which is linearly independent of the direction of movement of the first component.

SHORT DESCRIPTION OF THE FIGURES

The invention is illustrated in more detail using the following figures, without being limited to the shown variations. The figures show:

FIG. 1: A schematic representation of the invention in a basic version.

Figure 2:
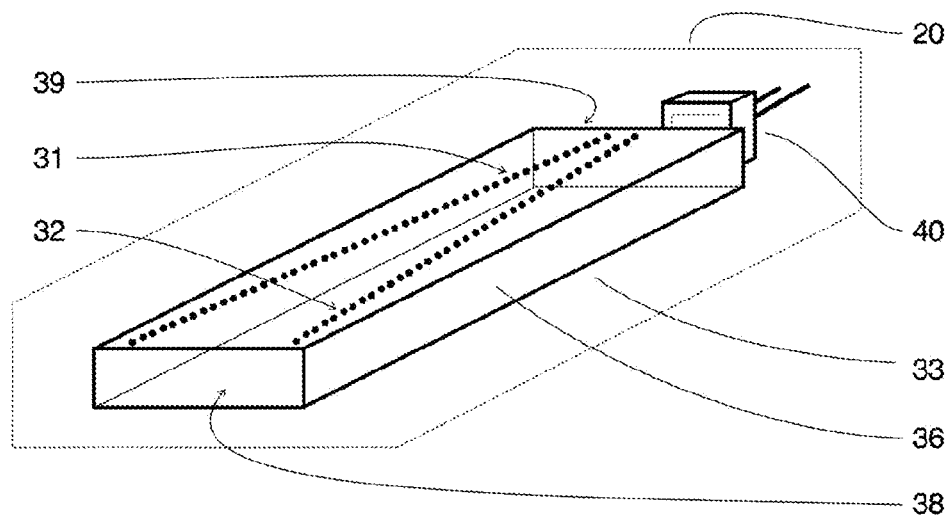

FIG. 2: A first possible version of the detector arrangement of the apparatus according to the invention with a light guide and two light-diffusing structures.

Figure 3:
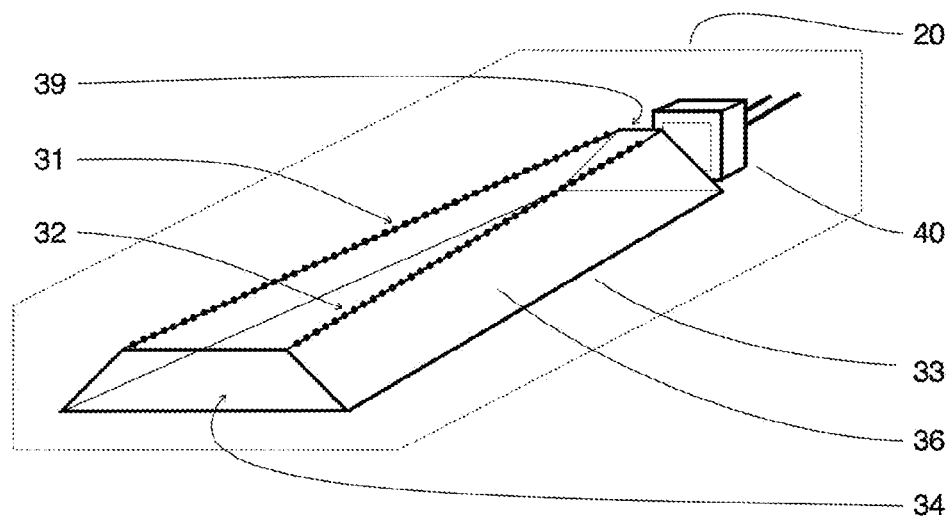

FIG. 3: A second possible variation of the detector arrangement with a light guide and two light-diffusing structures.

Figure 4:
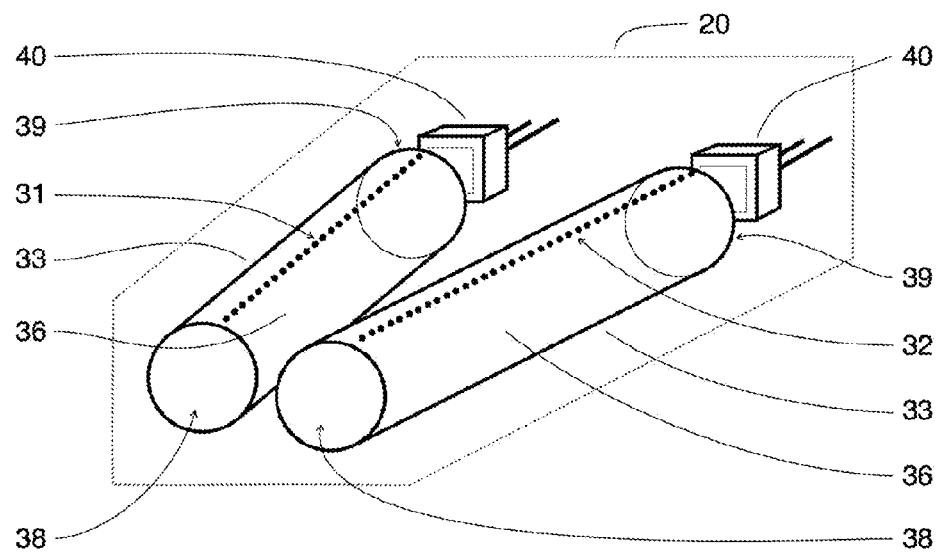

FIG. 4: A third possible version of the detector arrangement of the apparatus according to the invention with two light guides, that contain one light-diffusing structure each.

Figure 5:
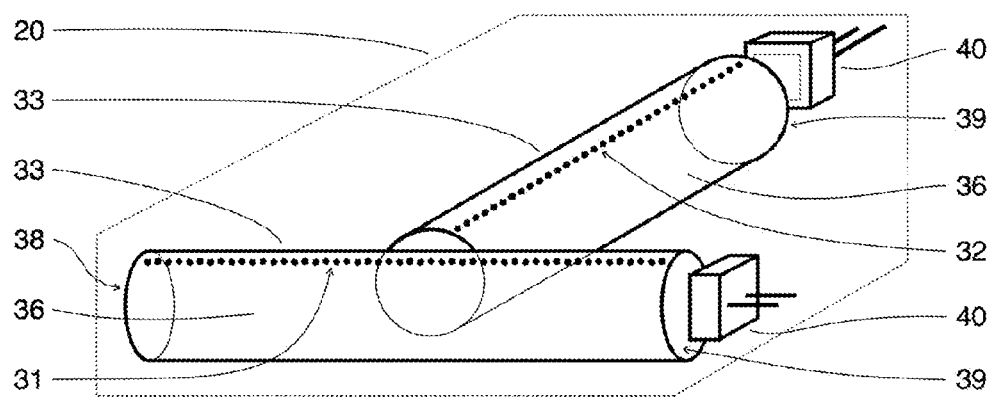

FIG. 5: A fourth possible version of the detector arrangement with two light guides, that contain one light-diffusing structure each.

Figure 6:
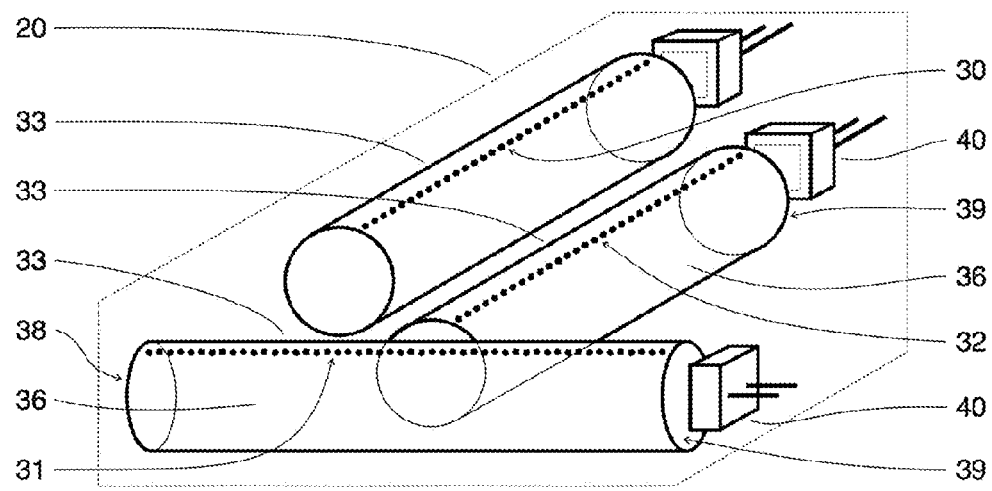

FIG. 6: A further possible version of the detector arrangement of the apparatus according to the invention with three light guides, that contain one light-diffusing structure each and where one of the light guides is arranged in another level.

Figure 7:
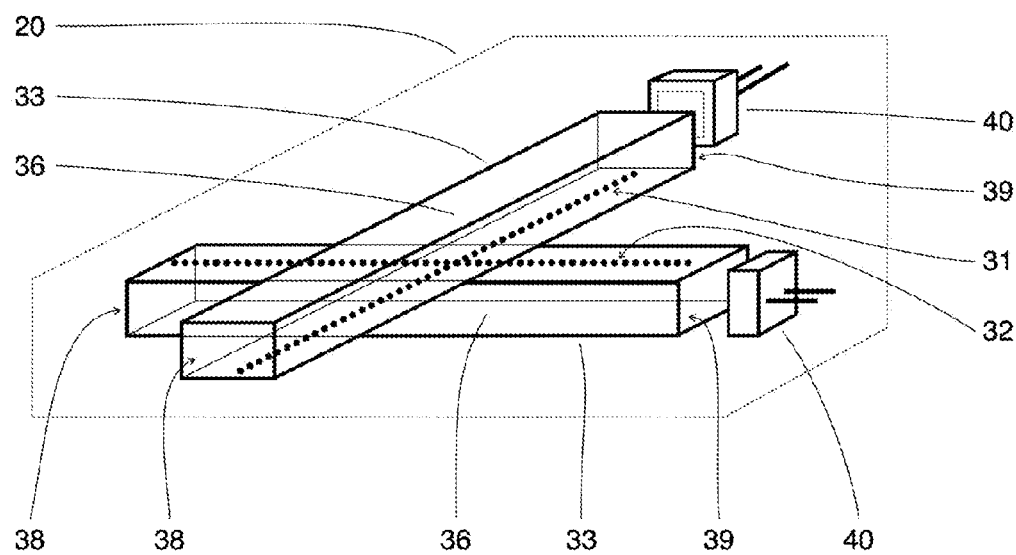

FIG. 7: A further possible version of the detector arrangement of the apparatus according to the invention with two light guides in a crossed arrangement.

Figure 8:
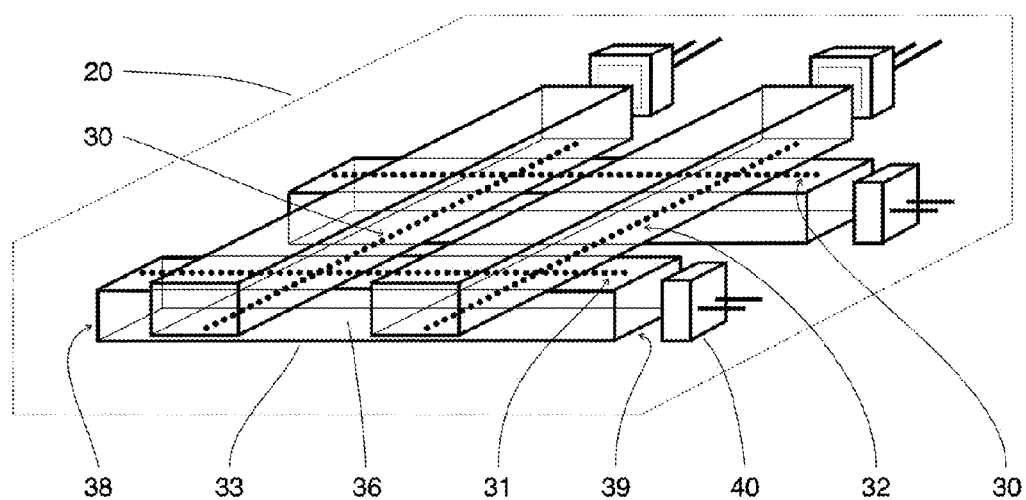

FIG. 8: Another possible version of the detector arrangement of the apparatus according to the invention with four light guides in a crossed arrangement.

Figure 9:
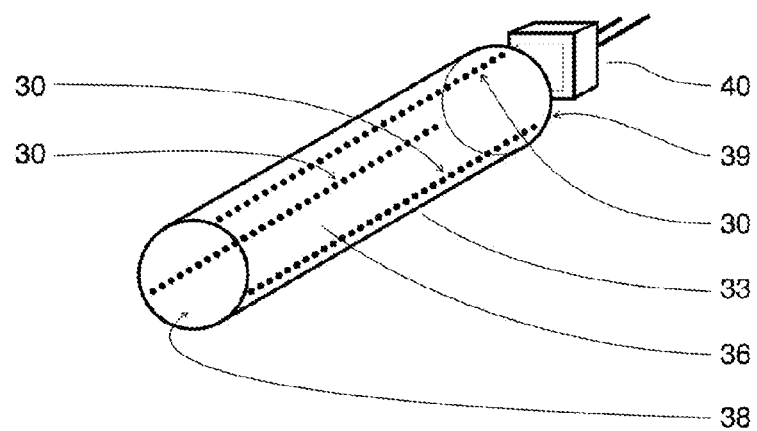

FIG. 9: A light guide with several light-diffusing structures, that are arranged in different levels, as part of the detector arrangement of the apparatus according to the invention.

Figure 10:
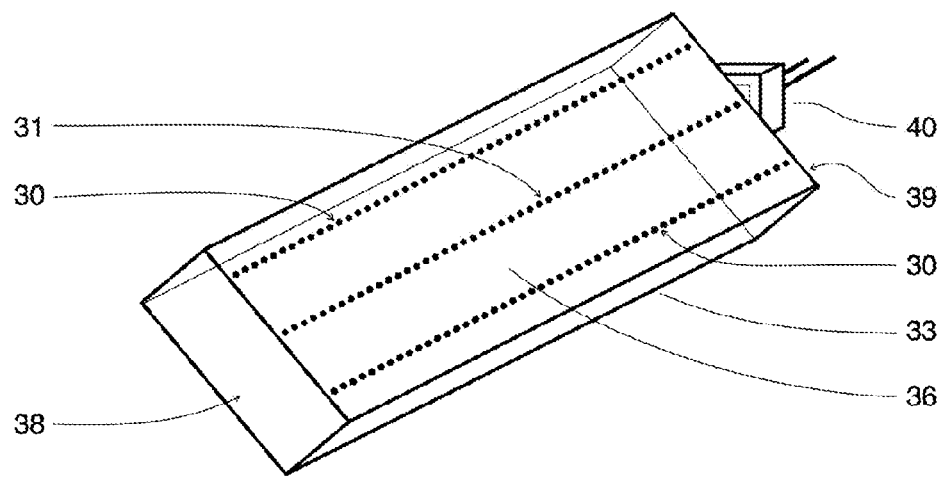

FIG. 10: A further version of the light guide with several light-diffusing structures as part of the detector arrangement of the apparatus according to the invention.

Figure 11:
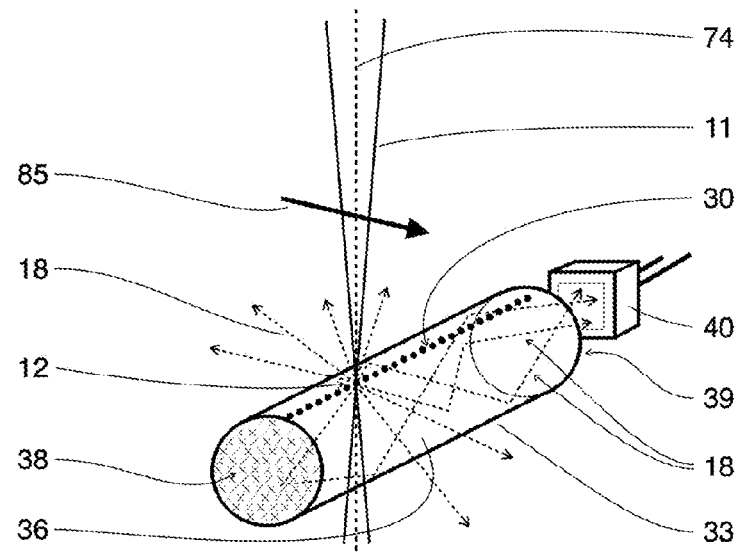

FIG. 11: A schematic perspective representation of the scattering of a part of the laser beam by the light-diffusing structure and the transport of the diffused radiation in the light-conducting region of the light guide to the light-sensitive sensor.

Figure 12:
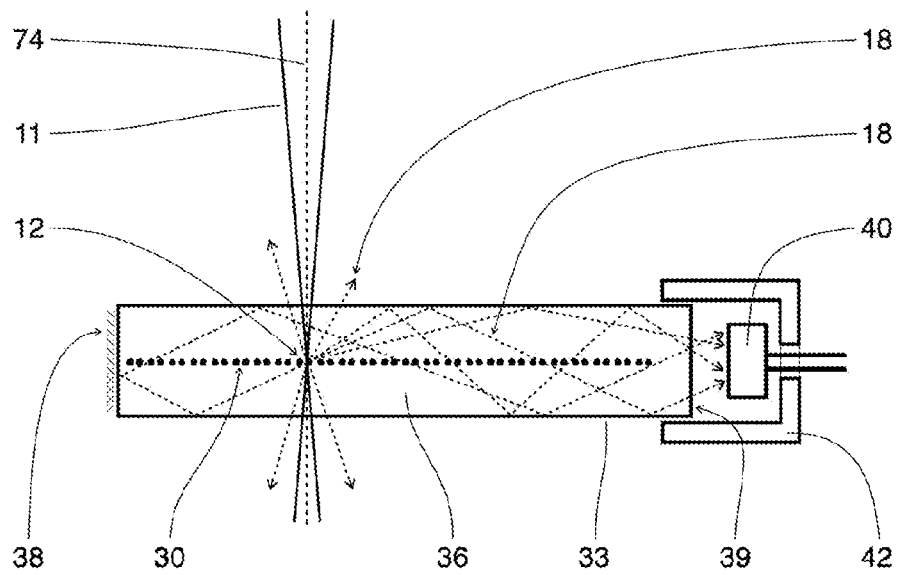

FIG. 12: A schematic cross-section image of the scattering of a part of the laser beam by the light-diffusing structure, the transport of the scattered radiation in the light-conducting region of the light guide to the light-sensitive sensor, and a cover of the light-sensitive sensor. The light-diffusing structure is arranged in the middle of the light guide in this example.

Figure 13:
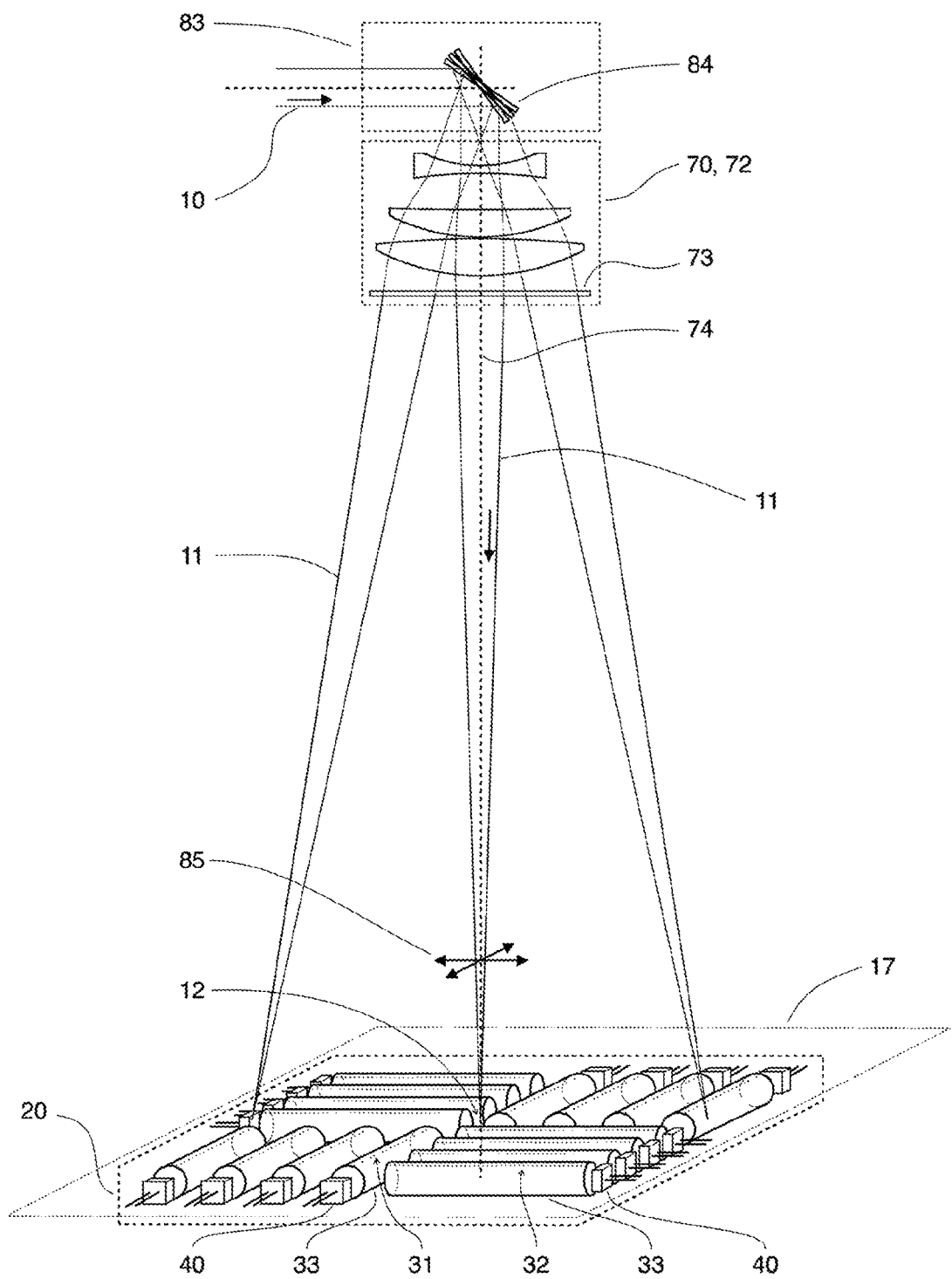

FIG. 13: A schematic representation of the invention in one version with scanner optics, in which the laser beam can be positioned in an active region and guided along a path by means of scanner mirror.

Figure 14:
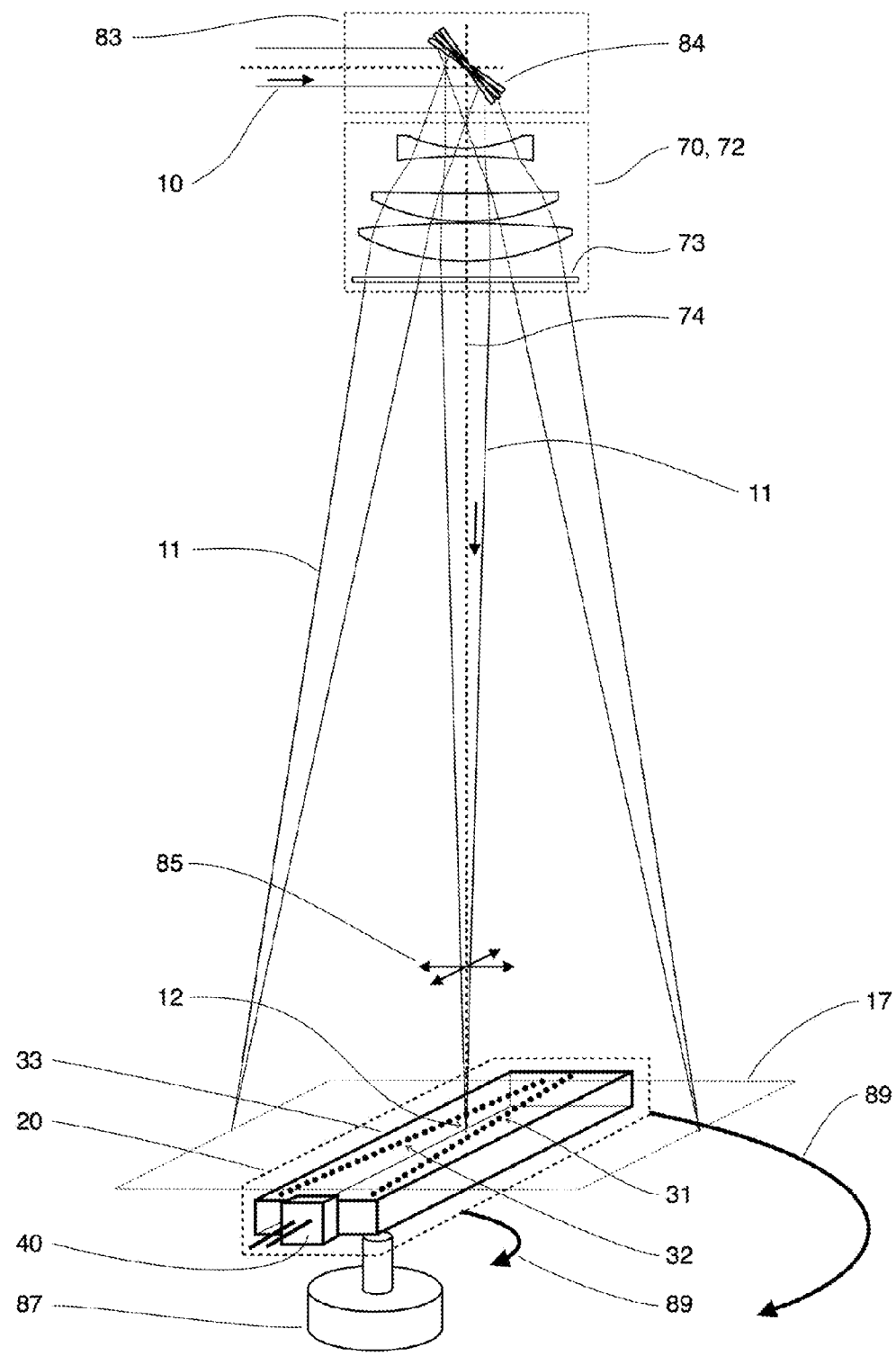

FIG. 14: A schematic representation of the invention in one version, in which the detector arrangement can be moved in a rotational motion to the laser beam.

Figure 15:
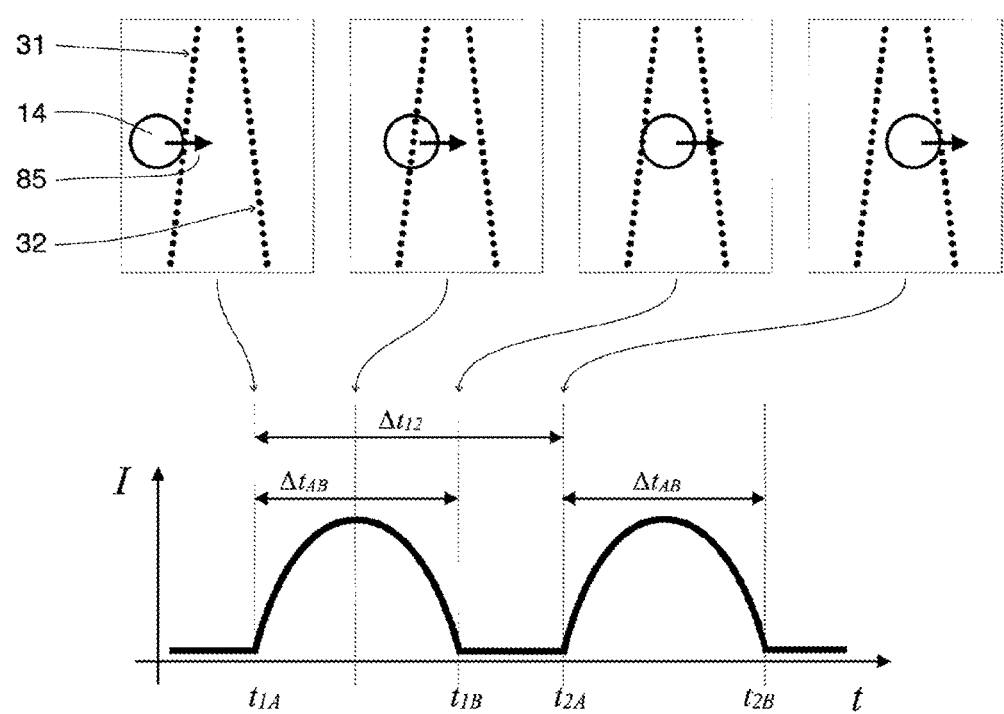

FIG. 15: A representation of the temporal signal path when guiding a laser beam over the light-diffusing structures, which are narrow in relation to the diameter of the laser beam in this example.

Figure 16:
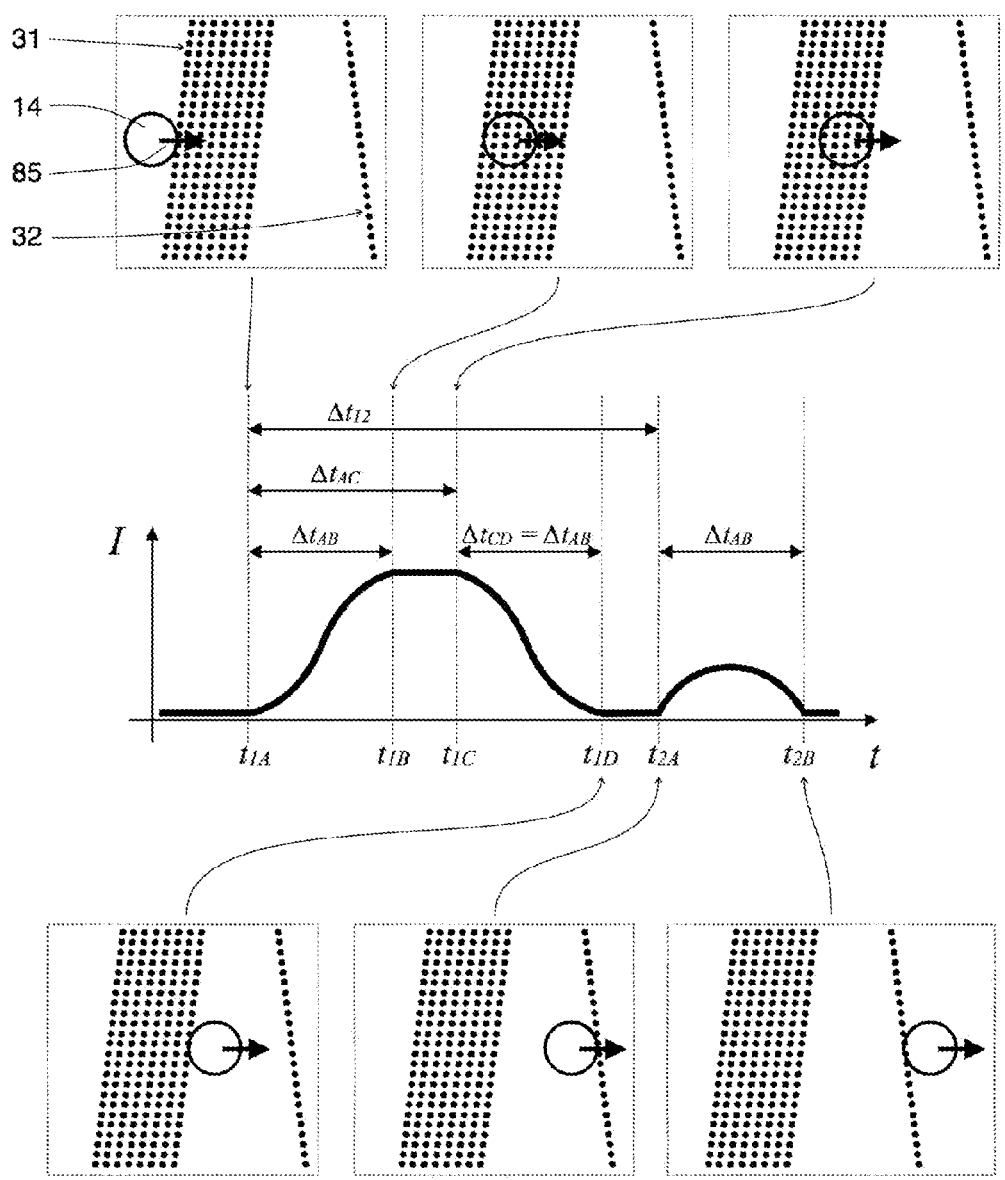

FIG. 16: A representation of the temporal signal path when guiding a laser beam over the light-diffusing structures wherein in this example one of the structures is wide and the other structure is narrow in relation to the diameter of the laser beam.

Figure 17:
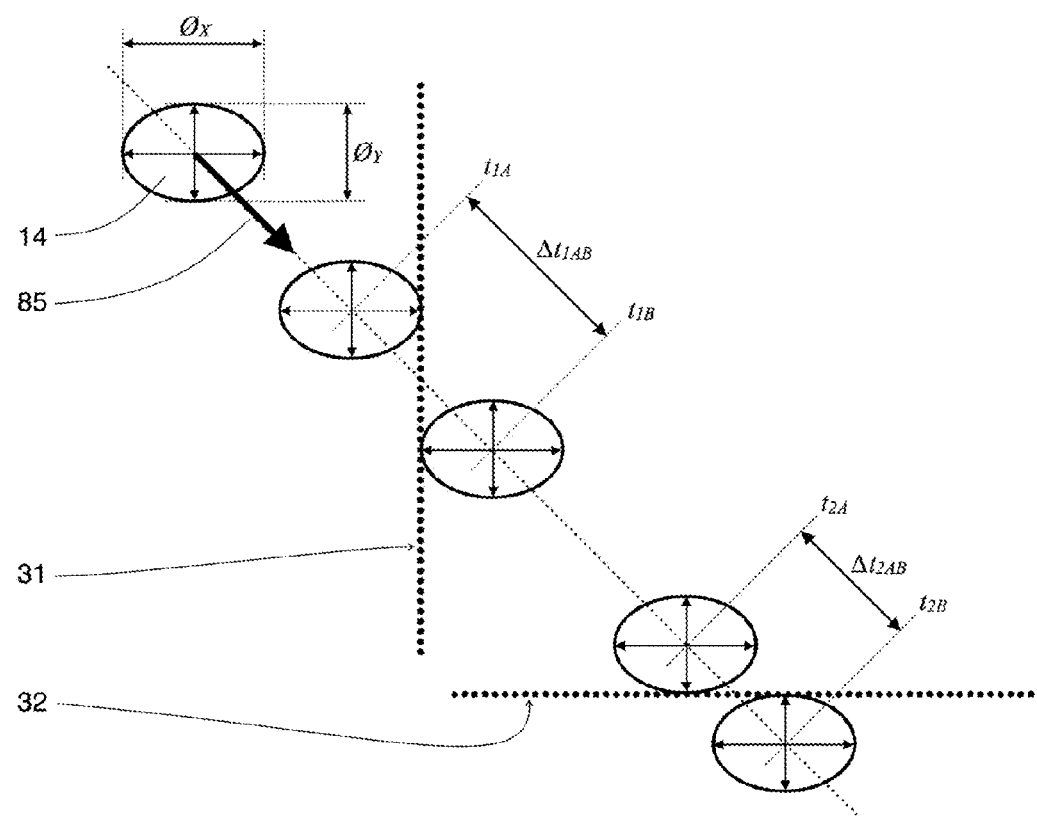

FIG. 17: An example of how the apparatus according to the invention can be used to determine the beam dimensions and/or the beam profile of a laser beam in two directions with just a single scanning movement.

DETAILED DESCRIPTION OF THE FIGURES

FIG. 1 shows a schematic representation of the invention in a basic version. A laser beam 10 is emitted by a device 70 for the emission of a laser beam into an active region 17. In the version shown, the device 70 for the emission of a laser beam includes an optical system 72 with an optical axis 74. The laser beam 10 is imaged by optical system 72, so that the beam emitted by device 70 forms a focused laser beam 11, which develops a laser beam focus 12 in the active region 17. A detector arrangement 20 is positioned in the active region 17, it contains a light guide 33 with a light-conducting region 36 and a light-emitting surface 39, a light-sensitive sensor 40 and two light-diffusing structures 30. The signal generated by the light-sensitive sensor 40 is received by a device 50 for the signal recording. Furthermore, the apparatus contains a device 80 for the provision of a relative movement between the laser beam 10 or 11 and the detector arrangement 20. In the version shown in FIG. 1, the relative motion is indicated by a direction of movement 85 of the laser beam.

In FIG. 2 a first possible version of the detector arrangement 20 of the apparatus according to the invention with a light guide 33 and two light-diffusing structures 31, 32 is illustrated. In this version the detector arrangement 20 includes one light guide 33 and one light-sensitive sensor 40. The light guide can, for instance, have an elongated, rectangular form. One of the outer surfaces of the light guide 33 is configured as light-emitting surface 39. A outer surface of the light guide 33 situated opposite to the light-emitting surface 39 forms an end surface 38. The light-emitting surface 39 and the end surface 38 preferably limit the longest extent of the light guide 33. The volume of the light guide 33 between the light-emitting surface 39 and the end surface 38 forms the light-conducting region 36. In the version according to FIG. 2, two light-diffusing structures 30 are located on one of the elongated outer surfaces of the light guide. One of which is the first light-scattering structure 31, which is essentially extended along a first direction, and the other is the second light-diffusing structure 32 is essentially extended along a second direction. The first direction and the second direction include a small angle. The light-diffusing structures 30 (or 31 and 32) may, for instance be configured as local areas, that feature a micro-roughness on the otherwise polished outer surface of the light guide 33. The light-sensitive sensor 40 is arranged adjacent to the light-emitting surface 39 and receives the radiation emitted from the light-emitting surface 39.

FIG. 3 shows a second possible version of the detector arrangement 20 of the apparatus according to the invention with a light guide 33 and two light-diffusing structures 31, 32. In this version, the light-emitting surface 39 and the end surface 38 are designed in different sizes so that at least one of the elongated outer surfaces of the light guide 33 tapers trapezium-shaped and has two non-parallel edges. In this version, the light-diffusing structures 31 and 32 are formed by two non-parallel edges of the light guide 33. To achieve a defined light-diffusing effect, the edges can, for instance, be equipped with a small rough chamfer. However, the light-diffusing effect can also simply be provided through the tiny inhomogeneities of the edges, which the edges have due to the polishing process of the outer surfaces of the light guide 33. In further respects, the detector arrangement 20 according to FIG. 3 is similar to the detector arrangement shown in FIG. 2.

It is also provided that the detector arrangement 20 may include multiple light guides 33. FIG. 4 shows a possible variation of the detector arrangement 20 with two light guides 33. In this version, the light guides 33 are cylindrical rods or fibers. Each of the two rods contains one light-diffusing structure 30. One of the two light guides 33 contains the first light-diffusing structure 31, which is essentially extended along a first direction, and the other of the two light guides 33 contains the second light-diffusing structure 32, which is essentially extended along a second direction. The two light guides are not parallel but include a small angle. Thus, the two light-diffusing structures 31 and 32 also include a small angle. A light-sensitive sensor 40 is arranged at the light-emitting surfaces 39 of both light guides 33. The two light guides 33 can be arranged so that the light-diffusing structures 31 and 32 are at the same level.

In FIG. 5, a further possible version of the detector arrangement 20 of the apparatus according to the invention with several light guides 33 is shown. This version differs from the version shown in FIG. 4 by having a different alignment of the light guides 33. Here, the two light guides 33 are arranged in T-shape with an angle of approximately 90° to each other. Thus, the two light-diffusing structures 31 and 32 also include an angle of approximately 90°. The other features of this version are comparable to those of FIG. 4.

The version of the detector arrangement 20 shown in FIG. 6 contains the same elements as the version shown in FIG. 5, with the addition of a third light guide 33 and a third light-sensitive sensor 40. The third light guide 33 also contains a light-diffusing structure 30 but is arranged at a different level than the two light guides 33 with the first light-diffusing structure 31 and the second light-diffusing structure 32. This allows the beam diameter of a laser beam 10, 11 to be determined in two different cross-sectional planes with only one scanning operation.

FIG. 7 shows a further version of the detector arrangement 20 with two light guides 33 and two light-sensitive sensors 40. In this case, the two light guides 33 are arranged one above the other at an angle of approximately 90° to one another. One of the two light guides 33 includes the first light-diffusing structure 31 and the other of the two light guides 33 includes the second light-diffusing structure 32. The two light-diffusing structures 31 and 32 thus enclose an angle of approximately 90°. The first light-diffusing structure 31 is arranged on the underside of the upper of the two light guides 33 while the second light-diffusing structure 32 is arranged on the upper side of the lower of the two light guides 33. In this way, the two light-diffusing structures 31 and 32 can be arranged with a very small height offset. Here, the two light guides 33 are cuboid-shaped or configured as rods with a rectangular cross-section. This has the advantage that the laser beam is not altered in its geometry when it passes through, in particular, the upper light guide 33 before it encounters one of the light-diffusing structures 31, 32.

In FIG. 8, a similar detector arrangement 20 as in FIG. 7 is shown. In this case, the detector arrangement 20 includes four light guides 33 and four light-sensitive sensors 40. Each of the four light guides 33 has a light-diffusing structure 30. In each case, two of the four light guides 33 are arranged next to each other. Two light guides 33 arranged next to one another are arranged in a crossed over position with the two light guides 33 arranged next to one another. The two light guides 33 arranged side by side can be arranged parallel to each other or can enclose a small angle.

FIG. 9 shows a possible version of a single light guide 33 from a detector arrangement 20 with several light guides 33. Here, the light guide 33 is configured as a cylindrical rod or as a fiber and has several light-diffusing structures 30, which are essentially arranged parallel to one another. In this example, three light-diffusing structures 30 are distributed on the circumference of the cylindrical outer surface of the light guide 33 and are thus located in different planes. One of the light-diffusing structure 30 can be the first light-diffusing structure 31, which then includes a non-zero angle with a second light-diffusing structure 32 of a further light guide not shown in the figure. This allows the beam diameter of a laser beam 10, 11 to be determined in several different cross-sectional planes with only one scanning operation.

FIG. 10 shows a further possible version of a single light guide 33 from a detector arrangement 20 with several light guides 33. The light guide 33 is configured as a rectangular rod in this case and has several light-diffusing structures 30 on the outer side of the light guide 33 which are essentially arranged parallel to one another. The outer surface on which the light-diffusing structures are located, can be inclined to the scanning plane which is defined by the relative movement between the laser beam and the detector arrangement. This allows the beam diameter of a laser beam 10, 11 to be determined in several different cross-sectional planes with only one scanning operation.

FIG. 11 shows schematically the mode of operation of the scanning of the laser beam 10,11 by the detector arrangement 20. FIG. 11 shows only part of the detector arrangement 20 with only one light-diffusing structure 30. In this example, the laser beam is a focused laser beam 11 with an optical axis 74, which is predefined by an optical system 72 (not shown). The laser beam is guided along a direction of movement 85 across the detector arrangement 20 (only a part of which is shown here). As soon as at least a part of the laser beam 11 strikes the light-diffusing structure 30 of the light guide 33, the radiation is scattered at the light-diffusing structure 30, i.e. a scattered radiation 18 is generated, which is emitted in a large angular range. There is also a portion of scattered radiation 18, which is scattered into the light-conducting region 36 in an angular range, in which the radiation is reflected by total internal reflection at the outer surface or the boundary surface of the light guide 33 and is therefore transported within the light guide 33 until the scattered radiation 18 strikes the light-emitting surface 39 and can leave the light guide there. At least a portion of the scattered radiation 18, which is emitted by the light-emitting surface 39, then strikes the light-sensitive sensor 40. The end surface 38 of the light guide 33 is equipped with a reflective coating in this exemplary version. Thus, the scattered radiation 18, which is transported in the direction of the end surface 38 in the light-conducting region 36, is reflected on the end surface 38, transported in the light-conducting region 36 to the light-emitting surface 39 and can there leave the light guide 33 in the direction of the light-sensitive sensor.

FIG. 12 also schematically shows the mode of operation of the laser beam 10, 11 through the detector arrangement 20. The illustration shows the light guide 33 in a cross-section along the light guide. In this example, the light-diffusing structure 30 is located in the middle of the light-conducting region 36 of the light guide 33. In addition, a cover 42 is shown in this example. The cover 42 encloses the light-sensitive sensor 40 and the light-emitting surface 39 of the light guide 33. As a result, the light-sensitive sensor 40 is shielded from the residual light that can penetrate into the apparatus from the outside and the photosensitive sensor 40 can only receive the scattered radiation 18 generated by the light-diffusing structure 30.

FIG. 13 shows a possible version of the apparatus according to the invention in a schematic representation. A laser beam 10 is fed to a scanning optics, which includes a device 83 for moving the laser beam and a device 70 for emitting the laser beam. A device 83 for moving the laser beam is configured as a scanner mirror 84. To simplify the illustration, only one scanner mirror 84 is displayed, but two scanner mirrors 84 can also be arranged one after another. The laser beam 10 is deflected by an adjustable angle by means of the scanner mirror 84 and can thus be freely positioned in an active region 17 and guided in the directions of movement 85 along a path curve. The device 70 for the emission of the laser beam includes an optical system 72 with an optical axis 74 and a protective glass 73. The optical system 72 can in this case be planar field optics or a so-called f-theta objective and produces a focused laser beam 11 with a laser beam focus 12 inside the active region 17. The detector arrangement 20 is placeable in the active region 17. In the exemplary version shown, the detector arrangement 20 includes a total of sixteen light guides 33 and light-sensitive sensors 40, which are distributed over the active region 17 in groups of four light guides 33 and light-sensitive sensors 40 each, in different orientations. Each light guide has a light-diffusing structure 30, wherein two of the light guides 33, which are arranged in different orientations, include the first light-diffusing structure 31 and the second light-diffusing structure 32.

FIG. 14 shows a further possible version of the apparatus according to the invention in a schematic representation. This version differs from the version shown in FIG. 13 in its detector arrangement and is otherwise comparable to the version in FIG. 13. The detector arrangement 20 in this version essentially corresponds to the detector arrangement 20 shown in FIG. 2. Here, the detector arrangement 20 includes a light guide 33 with the first light-diffusing structure 31 and the second light-diffusing structure 32, wherein the light-diffusing structures 31 and 32 include a small angle, and a light-sensitive sensor 40. The detector arrangement 20 is positioned in the active region 17. In this version, the detector arrangement 20 is also coupled with a device 87 for the movement of the detector arrangement. By means of device 87 for the movement of the detector arrangement, the detector arrangement 20 can be rotated around an axis, so that the detector arrangement 20 can cover a large amount of the active region 17 with one movement in a direction of movement 89 and thus a laser beam 11 positioned in this area can be scanned. In addition, it is also possible, to position the detector arrangement 20 using device 87 for the movement of the detector arrangement in one or more positions in the active region 17 and to guide the laser beam over the detector arrangement 20 by means of device 83 for the movement of the laser beam.

FIG. 15 schematically shows a temporal signal trace when guiding a laser beam 10, 11 over the light-diffusing structures 31, 32. The detector arrangement 20 corresponds to, for example, the detector arrangement 20 shown in FIG. 2 and includes a light guide 33 with the first light-diffusing structure 31 and the second light-diffusing structure 32, wherein the light-diffusing structures 31 and 32 include a small angle and a light-sensitive sensor 40. The light-diffusing structures 31 and 32 are narrow in relation to the cross-section 14 of the laser beam or the diameter of the laser beam 10, 11. FIG. 15 shows the guiding of the laser beam across the light-diffusing structures at four different times and a corresponding signal path. The signal curve describes the intensity (symbol I) of the scattered radiation as a function of time (symbol t) registered on the photosensitive sensor 40, while the laser beam 10, 11 is guided across the light guide 33 with the direction of movement 85. As soon as the edge of the cross-section 14 of the laser beam 10, 11 reaches the first light-diffusing structure 31 (time $t_{1A}$), the signal I quickly increases. The signal I is at a maximum when the beam cross-section 14 is centrally irradiating the light-diffusing structure 31 (second section from the left in FIG. 15). Then, the signal I decreases again and reaches the minimum value when the edge of the beam cross-section 14 is just leaving the first light-diffusing structure 31 (time $t_{1B}$). This signal curve is repeated shortly afterwards, when the edge of the beam cross-section 14 reaches the second light-diffusing structure 32 (time $t_{2A}$). The signal I rises again, reaches a maximum value, and sinks back down to the minimum value when the edge of the beam cross-section 14 leaves the second light-diffusing structure 31 (time $t_{2B}$). Thus, the interval of time $\Delta t_{AB}$ between the times $t_{1A}$ and $t_{1B}$ or between the times $t_{2A}$ and $t_{2B}$ represents the diameter of the cross-section 14 or the laser beam 10, 11. The diameter can be calculated from the time interval $\Delta t_{AB}$ and the scanning speed. The time interval $\Delta t_{12}$ between the times $t_{1A}$ and $t_{2A}$, however, is dependent on the position where the laser beam 10, 11 crosses the two light-diffusing structures 31 and 32. Thus, the position of the laser beam 10, 11 can be determined from the time interval $\Delta t_{12}$.

FIG. 16 shows another example for a signal curve when guiding a laser beam 10, 11 across the light-diffusing structures 31, 32. Unlike the example in FIG. 15, the light-diffusing structure 31 in this case is wider than the cross-section 14 of the laser beam 10, 11. This results in a different signal path which can be evaluated in another way. The signal I increases as soon as the edge of the beam cross-section 14 reaches the first (or front) edge of the first light-scattering structure 31 (time $t_{1A}$). Here, the signal I further increases and only reaches a maximum when the laser beam 10, 11 fully hits the first light-diffusing structure 31 (time $t_{1B}$) with its entire cross section 14. The signal I remains at the maximum until the edge of the beam cross-section 14 reaches the second (or rear) edge of the first light-diffusing structure 31 (time $t_{1C}$) The beam cross-section 14 leaves the first light-diffusing structure 31 and runs over the second (rear) edge of the first light-diffusing structure 31, the signal I decreases again and reaches the minimum value as soon as the edge of the beam cross-section 14 leaves the second (rear) edge of the first light-diffusing structure 31 (time $t_{1D}$). The second part of the signal curve again corresponds to the curve illustrated in FIG. 15, since the second light-diffusing structure 32 is narrow in relation to the beam cross-section 14. In this example, there are three different characteristic time intervals $\Delta t_{AB}$, $\Delta t_{AC}$, and $\Delta t_{12}$. The time interval $\Delta t_{AB}$ again represents the diameter of the laser beam 10, 11 (or its cross-section 14), and the time interval $\Delta t_{12}$ is again dependent on the position of the laser beam 10, 11 (i.e. where the light-diffusing structures 31 and 32 are crossed). All three time intervals are scaled with the reciprocal path speed. In addition, the time interval $\Delta t_{AC}$ is dependent on the known width of the first light-diffusing structure 31, so that the path speed can be determined from this time interval. The relevant parameters beam diameter, beam position and path velocity can thus be determined from the three time intervals $\Delta t_{AB}$, $\Delta t_{AC}$, and $\Delta t_{12}$.

Finally, FIG. 17 schematically shows how the beam dimensions and/or the beam profiles of a laser beam in two spatial directions can be determined with the apparatus according to the invention with only a single scanning movement. In this example, the first light-diffusing structure 31 is arranged at an angle of approximately 90° to the second light-diffusing structure 32. The detector arrangement 20 can therefore, for example, correspond to the detector arrangements shown in FIG. 5, 6, 7 or 8. The cross-section 14 of the laser beam 10, 11 has different dimensions $Ø_x$ and $Ø_y$ in two spatial directions X and Y. The beam cross-section 14 is guided across the light-diffusing structures 31 and 32 by means of a relative movement of the laser beam 10, 11. The direction of movement 85 of the laser beam is, for example, selected in such a way that the two light-diffusing structures 31 and 32 are crossed at approximately the same absolute value of the angle (here approximately 45°). Then the width of the beam cross-section, which is oriented perpendicular to the first light-diffusing structure 31, can be determined from the time interval $\Delta t_{1AB}$, and the width of the beam cross-section which is oriented perpendicular to the second light-diffusing structure 32 can be determined from the time interval $\Delta t_{2AB}$.

DETAILED DESCRIPTION OF THE INVENTION

It is intended to provide a solution to the problem of determining characteristics of a laser beam by means of a method and an apparatus which are adapted for the measurement of laser radiation with highest power and brilliance and which enable a determination of at least one geometric beam parameter, such as, a beam diameter or a beam profile with higher accuracy and which can also be used in a large working area of the laser beam or in the case of a moving laser beam.

To solve the task, a method for determining properties of a laser beam with the process steps described in the following is proposed. A laser beam 10, 11 is emitted into an active region 17. A detector arrangement 20 is positioned in the active region 17. The detector arrangement 20 includes at least one light guide 33, at least one light-sensitive sensor 40, and at least two light-diffusing structures 30, and a first light-diffusing structure 31 of the at least two light-diffusing structures 30 essentially is extended along a first direction and a second light-diffusing structure 32 of the at least two light-diffusing structures 30 essentially is extended along a second direction. The first direction and the second direction are not parallel, but include an angle different from zero. The laser beam 10, 11 and the detector arrangement 20 are moved relative to each other. By means of the relative movement, the laser beam 10, 11 or a cross-section 14 of the laser beam 10, 11 is scanned by the detector arrangement 20. Scattered radiation 18 is generated by means of the light-diffusing structures 30, 31, 32 from a part of the laser beam 10, 11. A part of the Scattered radiation 18 is transported in a light-conducting region 36 of the at least one light guide 33 to a light-emitting surface 39 of the at least one light guide 33. Radiation emitted from the light-emitting surface 39 is received by means of a light-sensitive sensor 40 and a temporally varying signal is generated from the received radiation. Finally, the temporally varying signal is recorded and evaluated.

To solve the problem, an apparatus for determining the properties of a laser beam is proposed which includes a device 70 for the emission of a laser beam 10, 11 into an active region 17, a detector arrangement 20, which can be positioned in the active region 17, a device 80 for the provision of a relative movement between the laser beam 10, 11 and the detector arrangement 20, and a device 50 for the registration and evaluation of a temporally varying signal of the detector arrangement 20.

The detector arrangement 20 of the apparatus according to the invention includes at least one light guide 33, at least two light-diffusing structures 30, and at least one light-sensitive sensor 40. The light-diffusing structures 30 are each mainly extended along one direction. The at least two light-diffusing structures 30 include a first light-diffusing structure 31 and a second light-diffusing structure 32, which extend in different directions, i.e. the first light-diffusing structure 31 and the second light-diffusing structure 32 are not arranged parallel to one another but include an angle which is not zero. A further light-diffusing structure 30 can be arranged parallel or at another angle to the first or second light-diffusing structure 31 or 32. The first light-diffusing structure 31 and the second light-diffusing structure 32 can be arranged in a single light guide 33, such as shown in the FIGS. 2 and 3. In this case, the angle between the first and second light-scattering structure 31 and 32 can be relatively small, for example between 0.5° and 30°. The first light-diffusing structure 31 and the second light-diffusing structure 32 can alternatively each be arranged in an individual light guide 33. Examples hereof are shown in FIGS. 4, 5 and 7. In this case, the detector arrangement 20 includes at least two light guides 33. The two light guides 33 can then be arranged in any angle from another other than zero. Correspondingly, the angle between the first and second light-diffusing structure 31 and 32 can then also be any size, for example a value of 30°, 45°, 60° or 90°.

The light-diffusing structures 30, 31, 32 can be configured in form of local inhomogeneities on the surface or in the volume of the light guides 33. Inhomogeneities on the surface of the light guides 33 can, for example, be localized regions which have a micro-roughness, while the surrounding regions are polished surfaces. Such light-diffusing structures 30, 31, 32 based on micro-roughness on the surface of the light guides 33 can for example be produced by etching. The inhomogeneities on the surface of the light guides 33 can also be edges of the light guide 33. The edges resulting from a polishing process of the outer surfaces of a light guide 33, typically have statistical inhomogeneities on microscopic scale, which can be used for light scattering. It is also intended to equip selected edges of the light guide 33 with a small chamfer. These chamfers can, for example, be produced by grinding and exhibit a typical micro-roughness depending on the size of the abrasive particles. In this way, the light-diffusing structure 30, 31, 32 can be located on an edge of a light guide 33 with a defined width. The light-diffusing structures 30, 31, 32 can also be configured in form of local inhomogeneities in the volume of the light guides 33. The inhomogeneities in the volume of a light guide can for instance be areas with locally changed or varying refractive index or tiny bubbles in the material. Such inhomogeneities can be produced selectively, for example with special laser radiation. Typically, focused UV lasers are used to produce refractive index variations, much like in the manufacturing of so called Bragg grating in optical materials. Focused giant pulse lasers are typically used for producing bubbles. Local inhomogeneities of light-diffusing structures or of areas that exhibit a roughness can, for example, also be produced using so called laser-induced selective etching. In this case, the optical material (such as quartz or sapphire) is locally modified through irradiation with focused femtosecond laser pulses. The modified area can then be selectively removed through chemical etching (for example in potassium hydroxide solution). The production of the light guides 33 and the light-diffusing structures 30, 31, 32 is not limited to the mentioned way of production.

The at least one light guide 33 has a light-conducting region 36 which has an elongated shape. The light guide 33 can for instance be designed block-shaped, rod-shaped or cylindrical. One of the outer surfaces of the light guide 33 is formed as light-emitting surface 39. A outer surface of the light guide 33 situated opposite to the light-emitting surface 39 forms an end surface 38. The light-emitting surface 39 and the end surface 38 preferably limit the longest extent of the light guide 33. The volume of the light guide 33 between the light-emitting surface 39 and the end surface 38 forms the light-conducting region 36. The light-emitting surface 39 and the end surface 38 can have the same or a similar shape as the cross-section of the light guide 33 or the light-conducting region 36. The cross-section of the light guide 33 can, for instance, be round, elliptical, semicircular, square, rectangular, trapezoidal, triangular, drop-shaped, pentagonal or hexagonal or have another suitable shape. The size of the cross-section of the light guide 33 can vary along the length of the light guide 33.

Radiation can be transported within the light-conducting region 36 of the light guide 33. The transport of the radiation takes place as a result of total internal reflection of the radiation at the elongated outer surfaces of the light guide 33 or the light-conducting region 36. To achieve this, the material of the light guide 33 must have a refractive index larger than 1 (one), and the incident angle of the radiation to the perpendicular of the outer surface must be sufficiently large. Thus, a transport of radiation takes place only in a limited range of angles which are defined by the total internal reflection. Radiation portions, which exhibit a wide angle to the perpendicular of the elongated outer surfaces in the light-conducting region 36, have a small angle to the perpendicular of the light-emitting surface 39. Thus, no total internal reflection occurs on the light-emitting surface 39 for this radiation portion and the radiation portions can be emitted over the light-emitting surface 39.

The light guide 33 consists of an optical material transparent for the wavelength of the laser beam 10, 11. The transparent optical material has a very low absorption level. It is provided that the absorption of the material specific for the wavelength of the laser beam 10, 11 is less than 300 ppm/cm. The absorption can also be less than 100 ppm/cm, particularly less than 20 ppm/cm. Suitable materials are, for example, quartz glass, in particular synthetic quartz glass (fused silica), sapphire, zinc sulfide (ZnS), or calcium fluoride ($CaF_2$). However, other glasses, crystals, or crystal glasses with sufficiently low absorption can also be used.

Adjacent to the light-emitting surface 39 of the light guide 33 or in the vicinity of the light-emitting surface 39 a light-sensitive sensor 40 is arranged. The light-sensitive sensor 40 is configured to receive radiation which is emitted from the light-emitting surface 39 of the light guide 33. For this purpose, an additional optical element can be arranged between the light-emitting surface 39 and the light-sensitive sensor 40, which directs the radiation emitted by the light-emitting surface 39 to the light-sensitive sensor 40. This additional optical element can, for example, be a lens, a deflection mirror, a prism, or a rigid or flexible light-conducting element, or a combination of these elements.

When the detector arrangement 20 includes several light guides 33, then each light-emitting surface 39 is associated with a light-sensitive sensor 40. This can be a single light-sensitive sensor 40 for all light-emitting surfaces 39. However, all light-emitting surfaces 39 may also be associated with an individual light-sensitive sensor 40, then the detector arrangement 20 has as many light-sensitive sensors 40 as light guides 33. It is also intended that several light guides 33 are associated with one light-sensitive sensor 40 as a group, wherein there may also be several groups. A group of light guides 33 must not necessarily consist of light guides 33 that are arranged next to each other, for instance every second, third, fourth etc. light guide 33 could be grouped together, wherein one light-sensitive sensor 40 is associated with each group. In this way, sensors can be saved and it is nonetheless possible to assign signals of individual light guides 33 or their light-diffusing structures 30, 31, 32 in neighboring areas, in order to correctly evaluate the time intervals between the signals.

The apparatus according to the invention includes a device 80 for the provision of a relative movement between the laser beam 10, 11 and the detector arrangement 20. By means of the relative movement, the laser beam 10, 11 can be scanned by the detector arrangement 20, i.e. the cross-section 14 of the laser beam 10, 11 crosses the first and second light-diffusing structure 31 and 32 in one scanning motion. If part of the cross section 14 hits a light-diffusing structure 30, 31, 32, a scattered radiation 18 is created from a part of the laser radiation 10, 11. The scattered radiation 18 is emitted in a wide-angle range. There is also a portion of the scattered radiation 18, which is scattered into the light-conducting region 36 in an angle range in which the radiation is transported within the light-conducting region 36.

Part of the scattered radiation 18 leave the light guide 33 by means of the light-emitting surface 39 and hits the light-sensitive sensor 40. The light-sensitive sensor 40 creates an electrical signal as a function of the impacting radiation intensity. The light-sensitive sensor 40 may, for instance, be a photo diode, a photomultiplier, or another photoelectric converter element. The signal of the light-sensitive sensor 40 is forwarded to the device 50 for the signal registration and can be recorded and evaluated there. When the laser beam 10, 11 hits a light guide 33, but does not hit a light-diffusing structure 30, 31, 32, then radiation proportions in different angles within the light-conducting region 36 of the light guide 33 can still be created through refraction and partial reflection (so-called Fresnel reflection) on the boundary surfaces of the light guide 33, however, such radiation proportion can exit the light-conducting region 36 again when hitting the next boundary surface of the light guide 33 and are not guided to the light-emitting surface 39 through total internal reflection.

The relative motion between the laser beam 10, 11 and the detector arrangement 20 can be facilitated by different means. In one possible version of the invention, the detector arrangement 20 itself is movably mounted by means of a device 87 for the movement of the detector arrangement and can be moved using a drive of device 87. An example thereof is illustrated in FIG. 14. In this example, the detector arrangement is mounted rotatable over an axis. The direction of movement 89 of the detector arrangement is a rotational movement in this case. By way of the rotational movement, the first and the second light-diffusing structure 31 and 32 are guided through the cross-section 14 of the laser beam 10, 11 after each other. This creates a signal trace, as schematically shown in FIG. 15. The diameter of the beam cross-section 14 or the laser beam 10, 11 can be determined from the width of the signal pulses or the time interval $\Delta t_{AB}$. The distance of the laser beam 10, 11 to the rotation axis can be determined from the time lag of the signal impulses or the time interval $\Delta t_{12}$. In combination with the absolute time of the signal impulse, from which the angular position of the detector arrangement 20 can be determined, you receive the two-dimensional position of the laser beam 10, 11 in the area scanned by the detector arrangement 20 or in the active region 17, in which the detector arrangement 20 can be positioned. It may be provided that an axis rotation for a rotary movement of the detector arrangement 20 does not lead through a virtual intersection, which is defined by the extension of the directions of the first light-diffusing structure and the second light-diffusing structure 32.

The signal trace shown in FIG. 15 is generated when the light-diffusing structures 31, 32 are narrow in comparison to the beam cross-section 14 or the diameter of the laser beam 10, 11. The light-diffusing structures 30, 31, 32 can also be wider than the beam cross-section 14. FIG. 16 shows an example in which the first light-diffusing structure 31 is wider than the cross-section 14 of the laser beam 10, 11. In this case, the diameter of the beam is not determined from the width of the signal impulse but from the length of the increase of the signal pulse, i.e. from the width of the edge of the signal impulses or from the time interval $\Delta t_{AB}$. Mathematically speaking, the slope of the first signal pulse from FIG. 16 can be transferred into the first signal impulse in FIG. 15 through differentiation (mathematical derivative with respect to time). Conversely, the slope of the first signal impulse from FIG. 16 is obtained by integration of the first signal impulse from FIG. 15.

The device 87 for the movement of the detector arrangement can also be configured to carry out other movements than a rotation. This may for example be a linear motion in one direction of space, a linear motion in two spatial directions, a circular motion, an elliptical movement, or a grid-shaped movement. The motion can also consist of two components, wherein the first component can be a quicker partly periodic movement in a first spatial direction and the other component a slower movement in a second spatial direction.

In a further possible variation of the invention, the device 80 for the provision of a relative movement between the laser beam 10, 11 and the detector arrangement 20 includes a device 83 for the movement of the laser beam. The device 83 may be a guiding machine or a robot, with which the device 70 for the emission of the laser beam can be coupled.

The device 70 for the emission of a laser beam can, for instance, be a simple laser processing optics. The laser processing optics can be supplied with a laser beam 10 by a beam guide system, for example, an optical fiber cable or a system of mirrors. In the laser processing optics, the laser beam 10 is imaged by an optical system 72 so that a focused laser beam 11 is created. However, with the apparatus according to the invention, not only focused laser beams 11 can be measured. The measurement of, for example, collimated laser beams is also provided. In this case, the device 70 for the emission of a laser beam emits a collimated laser beam. It is also possible for the device 70 for the emission of a laser beam to include a laser beam generator or a laser beam source.

In another possible version of the invention, the device 83 for the movement of the laser beam 10, 11 includes scanner optics. In this case, one or more scanner mirrors 84 are usually arranged within the scanner optics by means of which the laser beam 10 can be deflected by an adjustable angle and thus freely positioned in an active region 17 and guided in directions of movement 85 along a path curve. The device 70 for the emission of the laser beam typically also includes an optical system 72 with an optical axis 74 and a protective glass 73 in a scanner optics. The optical system 72, can in this case be planar field optics or a so-called f-theta objective and produces a focused laser beam 11 with a laser beam focus 12 within the active region 17.

By means of the device 83 for the movement of the laser beam 10, 11, the laser beam 10, 11 can be guided along an arbitrary path curve. In these versions of the invention, the detector arrangement 20 can thus be positioned in a fixed position in the active region 17, and the scanning movement is performed by the device 83 for the movement of the laser beam. Moreover, the movement of the laser beam 10, 11 can in this case be a linear movement in one spatial direction, a linear movement in two spatial direction, a circular movement, an elliptical movement or a raster-shaped movement. The movement can also consist of two components, wherein the first component can be a faster partly periodic movement in one spatial direction and the other component can be a slower movement in a second spatial direction.

A scanning of the beam according to the example of FIG. 16 has the advantage that there are three different characteristic time intervals $\Delta t_{AB}$, $\Delta t_{AC}$, and $\Delta t_{12}$: the width of the edge of the first signal impulse or the duration of the second signal impulse ($\Delta t_{AB}$), the time difference from the beginning of the rising edge to the beginning of the descending edge of the first signal impulse ($\Delta t_{AC}$), and the time difference between the two signal impulses ($\Delta t_{12}$). All three time intervals are scaled with the reciprocal path speed. In addition, the time interval $\Delta t_{AB}$ is dependent on the diameter of the laser beam 10, 11, the time interval $\Delta t_{12}$ is dependent on the position of the laser beam 10, 11, and the time interval $\Delta t_{AC}$ is dependent on the width of the first light-diffusing structure 31, wherein the latter can be assumed as known. Thus, the relevant parameters beam diameter, beam position and path velocity can be determined from the three time intervals $\Delta t_{AB}$, $\Delta t_{AC}$, and $\Delta t_{12}$. The same amount of information can be obtained using not only two but three narrow light-diffusing structures for scanning. For this purpose, a further light-diffusing structure 30 can be provided in the detector arrangement 20 in addition to the first and second light-diffusing structure 31, 32.

The apparatus and the method have the following advantages due to the features according to the invention:

The apparatus is suitable for measuring laser beams with the highest power and power densities because the components which are exposed to the radiation do not absorb the radiation and the components are also only exposed to the laser radiation for very short time intervals due to the scanning movement.

Three relevant parameters can be determined using a single scanning motion: beam diameter, beam position, and path velocity.

The determination of beam dimensions in two spatial directions is possible with a single scanning movement.

The beam properties can be determined in an extended two-dimensional or spatial area, particularly in the active region of the laser beam.

The properties of moving laser beams can be determined even when the movement of the beam is not specifically predetermined.

In a possible version of the invention, the detector arrangement 20 can include a cover 42. The cover 42 encloses the light-sensitive sensor 40 and the light-emitting surface 39 of the light guide 33. The light-sensitive sensor 40 is thereby shielded from residual light or radiation which could otherwise directly hit the light-sensitive sensor 40 and thus create a faulty signal. If the detector arrangement 20 has several light guides 33 and several light-sensitive sensors 40, then a corresponding number of covers 42 can also be provided.

In a further possible version of the invention the end surface 38 of the light guide 33 can be equipped with a reflective coating as shown in FIGS. 11 and 12. By means of a reflective coating of the end surface 38, a portion of the scattered radiation 18, which is created by the light-diffusing structure 30, 31, 32 from the laser beam 10, 11 and is deflected in the direction of the end surface 38, can be reflected there and also received by the light-sensitive sensor 40 after being transported through the light-conducting region 36 and transmitted through the light-emitting area 39. A reflective coating of the end surface 38 has another advantageous effect. This prevents that residual light or radiation components can penetrate into the light-conducting region 36 from outside through the end surface 38 and thus create a faulty signal. If the detector arrangement 20 has several light guides 33, then reflective coatings can be provided on all end surfaces 38 of the light guides 33. The reflective coating of the end surface 38 can, for example, be a dielectric multilayer system or a metallic coating.

The versions of the detector arrangement 20 with cover 42 and reflective coating on the end surfaces 38 can achieve a complete shielding of the light-sensitive sensors 40 from any residual light that can penetrate into the apparatus from the outside and that the light-sensitive sensors 40 can only receive the scattered radiation 18 created by the light-diffusing structures 30, 31, 32.

In a further possible version of the invention, the detector arrangement 20 can include several light-diffusing structures 30, which are arranged in several different levels. In this case, each of the levels has a different distance from the device 70 for the emission of the laser beam. For example, several light guides 33 can be arranged in a step-like manner with one light-diffusing structure 30 each inside the detector arrangement. FIG. 6 shows an example of a detector arrangement with 3 light guides 33, of which two light guides 33 can be arranged in two different levels in a step-like manner. The detector arrangement 20 can also contain more than two stages. Thus, in a scanning operation, one cross-section 14 of the laser beam 10, 11, which lies in the respective plane of the stage, is detected per stage. The laser beam 10, 11 is thus scanned in several levels along the optical axis 74. In this way, a laser beam 11 can, for example, be scanned in an axial area around the laser beam focus 12 and thus a representative section of the caustics of the laser beam can be determined 11. Given a sufficient number of stages, the determination of a beam parameter product or the determination of a focus diameter and a divergence angle of the laser beam 11 is thus also possible.

It is obvious that the invention is not limited to the particular versions detailed in the description and the versions shown in the figures. Rather, the invention also encompasses versions which result from combinations of the features set out in the claims, in the description and in the figures.

LIST OF REFERENCE SYMBOLS

10 Laser beam
11 Focused laser beam
12 Laser-beam focus
14 Cross-section of the laser beam
17 Active region
18 Scattered radiation
20 Detector arrangement
30 Light-diffusing structures
31 First light-diffusing structure
32 Second light-diffusing structure
33 Light guide
36 Light-conducting region
38 End surface
39 Light-emitting surface
40 Light-sensitive sensor
42 Cover
50 Device for signal recording
70 Device for the emission of a laser beam
72 Optical system
73 Protective glass
74 Optical axis of the optical system
80 Device for the provision of a relative movement
83 Device for the movement of the laser beam
84 Scanner mirror
85 Direction of movement of the laser beam
87 Device for the movement of the detector arrangement
89 Direction of movement of the detector arrangement

What is claimed is:

1. An apparatus for determining the characteristics of a laser beam, comprising
a device (70) for the emission of a laser beam (10, 11) into an active region (17),
a detector arrangement (20), which is placeable in the active region (17),
a device (80) for the provision of a relative movement between the laser beam (10, 11) and the detector arrangement (20), and
a device (50) for recording and evaluating a temporally varying signal of the detector arrangement (20),
wherein the detector arrangement (20) comprises:
at least one light guide (33) with a light-emitting surface (39) and a light-conducting region (36), wherein the light-conducting region (36) has an elongated shape,
at least two light-diffusing structures (30), wherein the first light-diffusing structure (31) of the at least two light-diffusing structures (30) is essentially extended along a first direction and a second light-diffusing structure (32) of the at least two light-diffusing structures (30) is essentially extended along a second direction and wherein the first direction and the second direction include a non-zero angle, and
at least on light-sensitive sensor (40), which is configured to receive radiation emitted from the light-emitting surface (39) of the light guide (33),
and wherein the at least to light-diffusing structures (30) are configured to scatter part of the laser beam (10, 11), which is hitting the light-diffusing structures (30), in an angular range which is adapted for transporting scattered laser radiation (18) in the light-conducting region (36) of the light guide (33) to the light-emitting surface (39).

2. The apparatus according to claim 1, wherein the device (80) for the provision of a relative movement is configured to scan a cross-section (14) of the laser beam (10, 11) by means of the detector arrangement (20).

3. The apparatus according to claim 1, wherein the device (80) for the provision of a relative movement is configured to scan a cross-section (14) of the laser beam (10, 11) by means of the detector arrangement (20) in two different directions.

4. The apparatus according to claim 1, wherein the relative movement is essentially a circular movement or an elliptical movement.

5. The apparatus according to claim 1, wherein the relative movement is essentially a rotary movement.

6. The apparatus according to claim 1, wherein the relative movement includes a first and a second component and the first component is an at least partly periodic fast movement and the second component is a slow movement in a linearly independent direction of the direction of movement of the first component.

7. The apparatus according to claim 1, wherein both the first light-conducting structure (31) extended in the first direction as well as the second light-conducting structure (32) extended in the second direction are part of the at least one light guide (33).

8. The apparatus according to claim 1, wherein the detector arrangement includes at least two light guides (33), and wherein the first light-conducting structure (31), extended in the first direction, is part of a first of the at least two light guides (33) and the second light-conducting structure (32), extended in the second direction, is part of a second of at the least two light guides (33).

9. The apparatus according to claim 1, wherein the at least one light guide (33) is made of a transparent optical material with very low absorption.

10. The apparatus according to claim 9, wherein the transparent optical material of the light guide (33) has an absorption specific for the wavelength of the laser radiation (10, 11) of less than 300 ppm/cm.

11. The apparatus according to claim 1, wherein the device (80) for the provision of a relative movement includes a device (87) for the movement of the detector arrangement (20).

12. The apparatus according to claim 1, wherein the device (80) for the provision of a relative movement includes a device (83) for the movement of the laser beam (10, 11).

13. The apparatus according to claim 12, wherein the device (83) for the movement of the laser beam includes a scanner optics.

14. A method for determining the properties of a laser beam, including the process steps:

Emitting a laser beam (10, 11) into an active region (17),

Positioning a detector arrangement (20) in the active region (17), wherein the detector arrangement (20) includes at least one light guide (33), at least one light-sensitive sensor (40) and at least two light-diffusing structures (30), and wherein the first light-diffusing structure (31) of the at least two light-diffusing structures (30) is essentially extended along a first direction and a second light-diffusing structure (32) of the at least two light-diffusing structures (30) is essentially extended along a second direction and wherein the first direction and the second direction include a non-zero angle, Providing a relative movement between the laser beam (10, 11) and the detector arrangement (20), Generating scattered radiation from part of the laser beam (10, 11) by means of the light-diffusing structures, Transporting of part of the scattered radiation in a light-conducting region (36) of the at least one light guide (33) to a light-emitting surface (39) of the at least one light guide (33), Receiving of the radiation, which is emitted by the light-emitting surface (39), by means of a light-sensitive sensor (40) and generating a time varying signal from the received radiation, and Recording and evaluating the time varying signal.

15. The method according to claim 14, further including a scanning of the cross-section (14) of the laser beam (10, 11) by means of the detector arrangement (20).

16. The method according to claim 14, further including a scanning of the cross-section (14) of the laser beam (10, 11) by means of the detector arrangement (20) in two different directions.

17. The method according to claim 14, wherein the laser beam (10, 11) is moved in circular or elliptical paths relative to the detector arrangement (20).

18. The method according to claim 14, wherein the detector arrangement (20) is moved rotating relative to the laser beam (10, 11).

19. The method according to claim 14, wherein the laser beam (10, 11) is moved relative to the detector arrangement (20) in a movement with one component and with a second component, wherein the first component is an at least partly periodic fast movement and the second component is a slow movement in a linearly independent direction of the direction of movement of the first component.

* * * * *